United States Patent
Hayamatsu

(10) Patent No.: US 7,716,431 B2
(45) Date of Patent: May 11, 2010

(54) ANALYSIS TECHNIQUE OF EXECUTION STATES IN COMPUTER SYSTEM

(75) Inventor: Kenji Hayamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 608 days.

(21) Appl. No.: 11/071,307

(22) Filed: Mar. 4, 2005

(65) Prior Publication Data
US 2006/0143291 A1 Jun. 29, 2006

(30) Foreign Application Priority Data
Dec. 24, 2004 (JP) ............................. 2004-374290

(51) Int. Cl.
G06F 12/00 (2006.01)
G06F 13/00 (2006.01)
G06F 13/28 (2006.01)
G06F 15/173 (2006.01)

(52) U.S. Cl. .............................. 711/156; 709/224
(58) Field of Classification Search ................. 709/224; 711/156
See application file for complete search history.

(56) References Cited

U.S. PATENT DOCUMENTS

| | | | | |
|---|---|---|---|---|
| 6,266,804 B1 * | 7/2001 | Isman | ........................ | 717/125 |
| 6,560,717 B1 * | 5/2003 | Scott et al. | ..................... | 714/4 |
| 6,591,274 B1 * | 7/2003 | Smith et al. | ............. | 707/103 R |
| 7,133,805 B1 * | 11/2006 | Dankenbring et al. | ....... | 702/186 |
| 7,263,583 B2 * | 8/2007 | Hood et al. | .................. | 711/114 |
| 2002/0173977 A1 * | 11/2002 | Dutta | ............................ | 705/1 |
| 2003/0163512 A1 * | 8/2003 | Mikamo | ..................... | 709/102 |
| 2003/0163734 A1 * | 8/2003 | Yoshimura et al. | .......... | 713/201 |
| 2005/0135340 A1 * | 6/2005 | Lee et al. | ..................... | 370/352 |
| 2005/0166204 A1 * | 7/2005 | Takatsu et al. | .............. | 718/100 |
| 2005/0216235 A1 * | 9/2005 | Butt et al. | ................... | 702/186 |
| 2007/0214261 A1 * | 9/2007 | Kikuchi et al. | .............. | 709/224 |

FOREIGN PATENT DOCUMENTS

JP     2003-281293     10/2003

* cited by examiner

Primary Examiner—Sheng-Jen Tsai
(74) Attorney, Agent, or Firm—Fujitsu Patent Center

(57) ABSTRACT

An information processing method according to this invention is a method executed when one or a plurality of applications are executed in an arbitrary node in a computer system including a plurality of nodes, which comprises: obtaining data representing an execution state of an application for the plurality of nodes; calculating a used capability value for each application by using the data representing the execution state of the application and a capability value for each node; obtaining data representing an application usage frequency of each user for the plurality of nodes; calculating a usage ratio of each user for each application by using the data representing the application usage frequency; and calculating a ratio of the used capability value for the total capability value of the computer system for each user and each application by using the used capability value and the usage ratio.

9 Claims, 9 Drawing Sheets

| CLIENT SIDE IP ADDRESS | LOG ON USER ID | SERVER IP ADDRESS OF ACCESS DESTINATION | TRANSACTION ID | ACCESS TIME (SECOND) |
|---|---|---|---|---|
| 174.9.999.123 | A001 | 174.9.888.123 | seisan-01 | 1000 |
| 174.9.999.224 | A002 | DITTO | dwh-001 | 2000 |
| 174.9.999.345 | A003 | DITTO | crm-001 | 4000 |

FIG.5

| TRANSACTION ID | APPLICATION |
|---|---|
| seisan | ERP |
| dwh | DWH |
| crm | CRM |
| : | : |
|  |  |

FIG.6

| CLIENT SIDE IP ADDRESS | LOG ON USER ID | SERVER IP ADDRESS OF ACCESS DESTINATION | TRANSACTION ID | APPLICATION | ACCESS TIME (SECOND) |
|---|---|---|---|---|---|
| 174.9.999.123 | A001 | 174.9.888.123 | seisan-01 | ERP | 1000 |
| 174.9.999.224 | A002 | DITTO | dwh-001 | DWH | 2000 |
| 174.9.999.345 | A003 | DITTO | crm-001 | CRM | 4000 |

FIG.7

| APPLICATION | LOG ON USER ID | USAGE TIME (SECOND) |
|---|---|---|
| ERP(BACKBONE SYSTEM) | A001 | 2500 |
|  | A002 | 2500 |
|  | A003 | 5000 |
| DWH(ANALYSIS SYSTEM) | A001 | 4000 |
|  | A004 | 3000 |
|  | A005 | 3000 |

FIG.8

| APPLICATION | LOG ON USER ID | USAGE TIME (SECOND) | RATIO |
|---|---|---|---|
| ERP(BACKBONE SYSTEM) | A001 | 2500 | 0.25 |
| | A002 | 2500 | 0.25 |
| | A003 | 5000 | 0.5 |
| DWH(ANALYSIS SYSTEM) | A001 | 4000 | 0.4 |
| | A004 | 3000 | 0.3 |
| | A005 | 3000 | 0.3 |

|        | ERP    | DWH    | CRM    | CREDIT & DEBT SYSTEM | TOTAL CPU USAGE TIME |
|--------|--------|--------|--------|----------------------|----------------------|
| NODE 1 | 530000 |        |        |                      | 530000               |
| NODE 2 | 10000  | 200000 |        |                      | 210000               |
| NODE 3 |        | 20000  | 250000 |                      | 270000               |
| NODE 4 |        |        | 250000 |                      | 250000               |
| NODE 5 |        |        |        | 250000               | 250000               |

FIG.11

| APPLICATION NAME | NODE | USAGE TIME (SECOND) |
|---|---|---|
| ERP (BACKBONE SYSTEM) | NODE 1 | 530000 |
|  | NODE 2 | 10000 |
|  |  |  |
| DWH (ANALYSIS SYSTEM) | NODE 2 | 200000 |
|  | NODE 3 | 20000 |
|  |  |  |
| CRM (CUSTOMER MANAGEMENT SYSTEM) | NODE 3 | 250000 |
|  | NODE 4 | 250000 |
| ACCOUNTING SYSTEM |  |  |
| CREDIT & DEBT SYSTEM | NODE 5 | 250000 |
| PATENT MANAGEMENT SYSTEM |  |  |

FIG.12

| NODE | CAPABILITY VALUE |
|---|---|
| NODE 1 | 30 |
| NODE 2 | 30 |
| NODE 3 | 20 |
| NODE 4 | 20 |
| NODE 5 | 30 |

FIG.13

| APPLICATION NAME | NODE | USAGE TIME (SECOND) | USED RESOURCE BASIC-VALUE | TOTAL USED RESOURCE BASIC-VALUE |
|---|---|---|---|---|
| ERP (BACKBONE SYSTEM) | NODE 1 | 530000 | 30.0 | |
| | NODE 2 | 10000 | 1.4 | |
| | | | | 31.4 |
| DWH (ANALYSIS SYSTEM) | NODE 2 | 200000 | 28.6 | |
| | NODE 3 | 20000 | 1.5 | |
| | | | | 30.1 |
| CRM (CUSTOMER MANAGEMENT SYSTEM) | NODE 3 | 250000 | 18.5 | |
| | NODE 4 | 250000 | 20.0 | |
| ACCOUNTING SYSTEM | | | | 38.5 |
| CREDIT & DEBT SYSTEM | NODE 5 | 250000 | 30.0 | |
| | | | | 30.0 |
| PATENT MANAGEMENT SYSTEM | | | | |
| | | | TOTAL | 130 |

FIG.14

| APPLICATION NAME | LOG ON USER ID | ACCESS TIME (SECOND) | RATIO | USED CAPABILITY BASIC-VALUE |
|---|---|---|---|---|
| ERP(BACKBONE SYSTEM) | A001 | 2500 | 0.25 | 7.85 |
| | A002 | 2500 | 0.25 | 7.85 |
| | A003 | 5000 | 0.5 | 15.7 |
| DWH (ANALYSIS SYSTEM) | A001 | 4000 | 0.4 | 12.04 |
| | A004 | 3000 | 0.3 | 9.03 |
| | A005 | 3000 | 0.3 | 9.03 |

FIG.15

| APPLICATION NAME | LOG ON USER ID | ACCESS TIME (SECOND) | RATIO | USED CAPABILITY BASIC-VALUE | USED CAPABILITY RATIO |
|---|---|---|---|---|---|
| ERP(BACKBONE SYSTEM) | A001 | 2500 | 0.25 | 7.85 | 0.06 |
| | A002 | 2500 | 0.25 | 7.85 | 0.06 |
| | A003 | 5000 | 0.5 | 15.7 | 0.12 |
| DWH(ANALYSIS SYSTEM) | A001 | 4000 | 0.4 | 12.04 | 0.09 |
| | A004 | 3000 | 0.3 | 9.03 | 0.07 |
| | A005 | 3000 | 0.3 | 9.03 | 0.07 |

| GROUP | LOG ON USER ID | COST | GROUP COST |
|---|---|---|---|
| G1 | A001 | 150 | 210 |
| | A002 | 60 | |
| G2 | A003 | 120 | 260 |
| | A004 | 70 | |
| | A005 | 70 | |

ANALYSIS TECHNIQUE OF EXECUTION STATES IN COMPUTER SYSTEM

TECHNICAL FIELD OF THE INVENTION

This invention relates to an analysis technique of execution states in a computer system.

BACKGROUND OF THE INVENTION

At present, in a backbone system application including the Enterprise Resource Planning (ERP) as a main application, it becomes a mainstream to integrate applications for each business purpose to operate them as one system. However, for several years, the increase of the cost by the increase of the number of servers has become a big problem in the customer. This is caused by reinforcing the capability of a server that executes a specific application or increasing the number of servers, when the processing amount increases for the specific application, because the server is prepared for each application, although plural applications are operated as one system. However, because all servers in the system do not usually use their full capabilities, the effective utilization of the idle resources is needed. Therefore, there is movement to adopt a mechanism that the operating state of the system is monitored to allocate the hardware resource dynamically and autonomously.

Incidentally, JP-A-2003-281293 discloses a method of charging for a data storage service. Specifically, a data volume converting means converts a volume of data of a user, which is stored in a storage, into a certain intermediate unit, and a use status monitoring means measures the volume of data in the storage at certain time intervals, records it into a residence information table, and records a file name and a storage path name of the data into a file information table. The charging processing means carries out a charging processing for each user on the basis of the residence information and the file information, and records the result into a user charging management information table. Then, a charging information providing means provides the charging information to the user. However, the system usage status of the application, which handles a little amount of data, cannot be accurately grasped based on the data amount.

As described above, when a mechanism in which the operating status of the system is monitored to allocate the hardware resource dynamically and autonomously is adopted, the system usage status by the user cannot be accurately grasped only by grasping the server-based usage status, that is, accumulating access time by each user for each server.

SUMMARY OF THE INVENTION

Therefore, an object of this invention is to provide a technique to grasp system usage status of each user accurately, even if one or plural applications are executed in an arbitrary node in a computer system including plural nodes.

Moreover, another object of this invention is to provide a technique to enable the charging according to the system usage status for each user.

An information processing method according to this invention is a method executed by a computer when one or a plurality of applications are executed in an arbitrary node in a computer system including a plurality of nodes, comprising: obtaining data representing an execution state of an application for the plurality of nodes, and storing it into an execution state data storage; calculating a used capability value for each application by using data stored in the execution state data storage and data stored in a capability data storage storing a capability value for each node; obtaining data representing an application usage frequency of each user for the plurality of nodes, and storing it into a usage frequency data storage; calculating a usage ratio of each user for each application, and storing them into a usage ratio data storage; and referring to the used capability value data storage and the usage ratio data storage to calculate a ratio of the used capability value for the total capability value of the computer system for each user and each application, and storing them into a ratio data storage.

Thus, by using the data representing the execution state of the application, even in the computer system having the aforementioned configuration, it becomes possible to grasp the user system usage status as the ratio of the used capability value for the total capability value of the computer system.

Moreover, the aforementioned method may further comprise referring to the ratio data storage to total the ratios for each user or each predefined user group, generating charging data for each user or each user group from the totaling result and a cost for the computer system, and storing it into a charging data storage. Thus, it becomes possible to use the ratios calculated above for the charging calculation. That is, the accurate charging is achieved.

Incidentally, the data representing the execution state of the application program may be a CPU usage time. In such a case, the calculating the used capability value may comprise: referring to the execution state data storage to calculate a total CPU usage time in each node, and store it into a data storage; referring to the execution state data storage to total a CPU usage time of each node for each application, and store the totaling result into the data storage; referring to the data storage to calculate a CPU usage ratio of each node for each application, and store the calculation result into the data storage; referring to the data storage and the capability data storage to calculate a used capability value of each application, and store it into the used capability value data storage by calculating a used capability value of each node for each application, and totaling the used capability values for each application. It is possible to carry out a processing based on the CPU usage time that can be obtained relatively easily.

Furthermore, the data representing the application usage frequency may be data of an access time. In such a case, the aforementioned calculating the usage ratio may comprise: referring to the usage frequency data storage to calculate a total access time of each user for each application, and storing it into the data storage; and referring to the data storage to calculate, as the usage ratio, a ratio of the total access time of each user for each application. It is possible to carry out a processing based on the access time that can be obtained relatively easily.

A program causing a computer to execute the information processing method according to this invention can be created, and the program is stored in a storage medium or storage device, such as a flexible disk, CD-ROM, magneto-optical disk, semiconductor memory, or hard disk. In addition, it may be distributed as digital signals via a network. Incidentally, intermediate data during processing is temporarily stored in a storage device such as a memory in a computer.

BRIEF DESCRIPTION OF THE DRAWINGS

FIG. 5 is a diagram showing an example of data stored in a log data storage;

FIG. 6 is a diagram showing an example of data stored in an application specification table;

FIG. 7 is a diagram showing an example of data stored in a modified log data storage;

FIG. 8 is a diagram showing an example of data stored in a total usage time data storage;

FIG. 11 is a diagram showing an example of data stored in a total CPU usage time data storage;

FIG. 12 is a diagram showing an example of data stored in the total CPU usage time data storage;

FIG. 13 is a diagram showing an example of data stored in a resource capability table;

FIG. 14 is a diagram showing an example of data stored in a used resource basic-value data storage;

FIG. 15 is a diagram showing an example of data stored in a used capability basic-value storage;

DETAILED DESCRIPTION OF THE PREFERRED EMBODIMENTS

Figure 1:
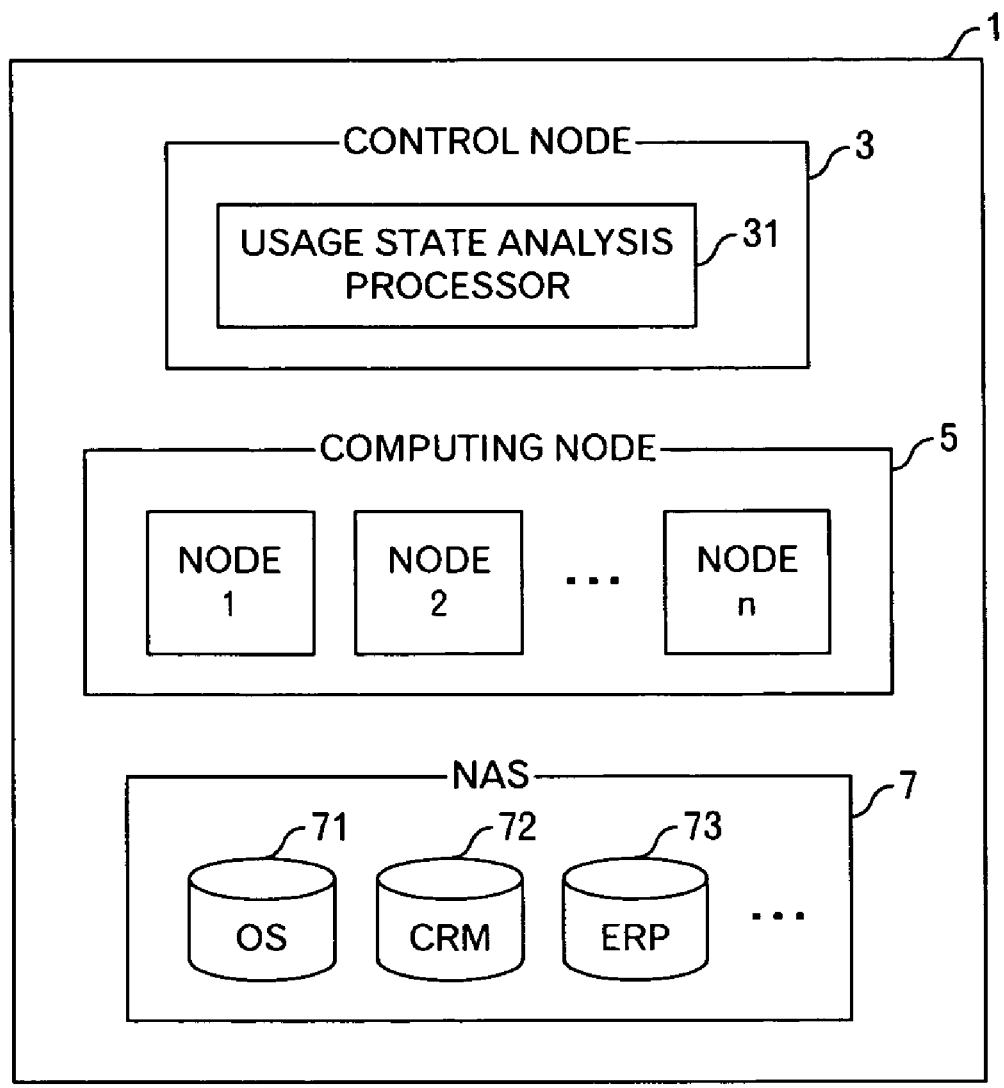
FIG. 1 is a system outline diagram in an embodiment of this invention.

FIG. 1 shows a system outline diagram according to one embodiment of this invention. A computer system 1 that is an analysis object and also carries out a processing according to this embodiment includes a control node 3 including one or plural nodes, computing nodes 5 including n nodes (n is a positive integer), for example, and a Network Attached Storage (NAS) 7. The NAS 7 stores an Operating System (OS) 71, and programs such as a Customer Relationship Management (CRM) 72, and ERP 73, and necessary programs are loaded at least to each node in the computing nodes 5 according to the control of the control node 3. Incidentally, the application program such as the CRM 72 and the ERP 73 is dynamically loaded and unloaded in each node included in the computing nodes 5 by the control node 3, and the service is provided without influencing the client terminals connected with the computer system 1. The control node 3 handles troubles and the like in the computing nodes 5 and controls the setup of the backup node or the like. Because the normal operations of the control node 3, the computing node 5, and NAS 7 are not main portions of this invention, the further explanation is omitted. Incidentally, the node is composed of a braid server, for instance.

Incidentally, the control node 3 has a usage state analysis processor 31 that carries out a main processing in this embodiment. Although an example is shown in which the usage state analysis processor 31 is provided in the computer system 1 to be analyzed, this invention is not limited to such a configuration, and it can be provided in another computer connected with the computer system 1.

Figure 2:
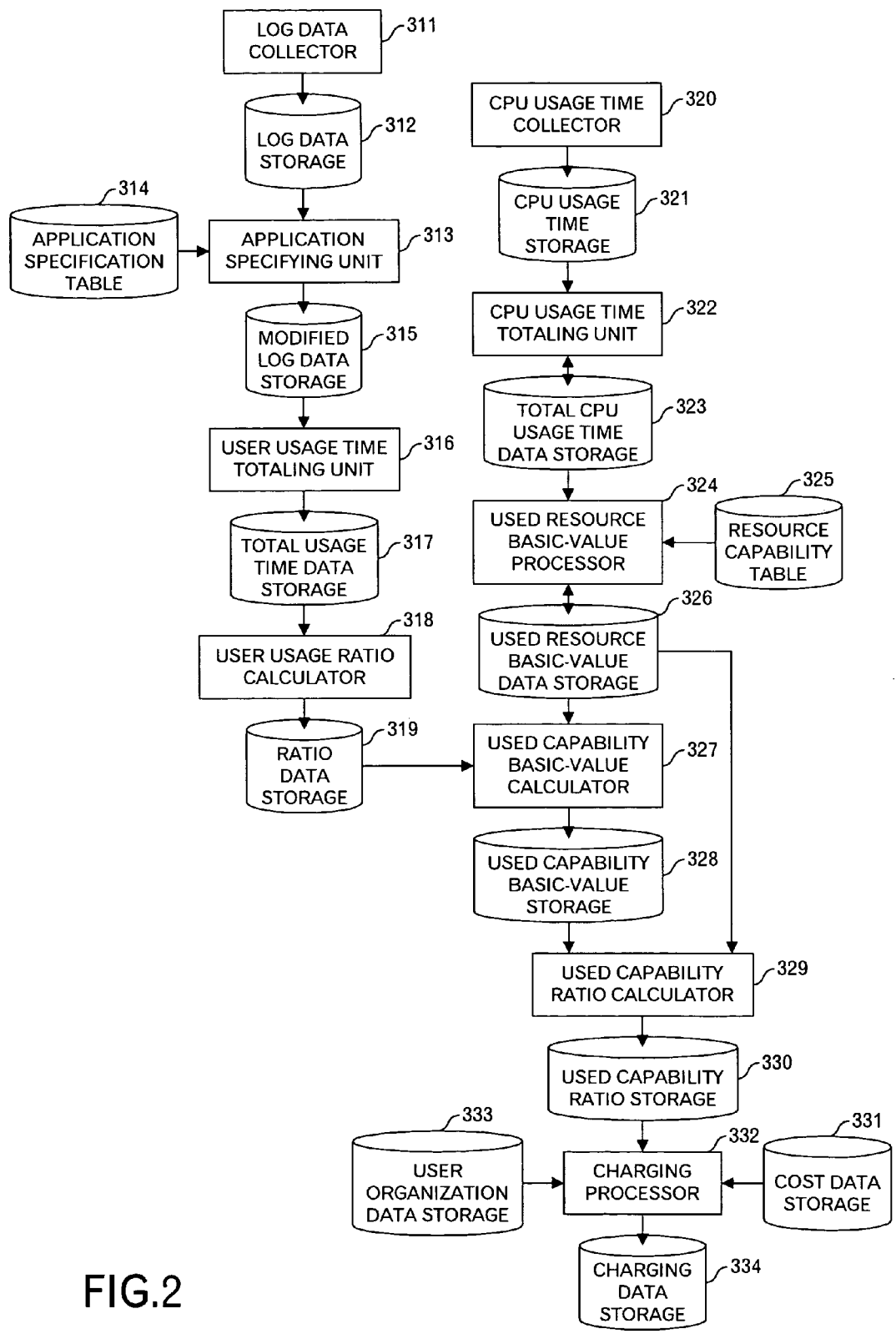
FIG. 2 is a functional block diagram of a usage state analysis processor.

FIG. 2 shows a functional block diagram of the usage state analysis processor 31. The usage state analysis processor 31 has a log data collector 311, a log data storage 312, an application specifying unit 313, an application specification table 314, a modified log data storage 315, a user usage time totaling unit 316, a total usage time data storage 317, a user usage ratio calculator 318, a ratio data storage 319, a CPU usage time collector 320, a CPU usage time storage 321, a CPU usage time totaling unit 322, a total CPU usage time data storage 323, a used resource basic-value processor 324, a resource capability table 325, a used resource basic-value data storage 326, a used capability basic-value calculator 327, a used capability basic-value storage 328, a used capability ratio calculator 329, a used capability ratio storage 330, a cost data storage 331, a charging processor 332, a user organization data storage 333, and a charging data storage 334.

The log data collector 311 acquires log data including a client side IP address, a logon user ID, a server IP address of a access destination, a transaction ID that can identify the application, and an access time from each node of the computing nodes 5, and stores the acquired log data into the log data storage 312. The application specifying unit 313 identifies the application of each log stored in the log data storage 312 by reading out data from the application specification table 314, and stores the processing result into the modified log data storage 315. The user usage time totaling unit 316 carries out a processing, reading out data from the modified log data storage 315, and stores the processing result into the total usage time data storage 317. The user usage ratio calculator 318 carries out a processing, reading out data from the total usage time data storage 317, and stores the processing result into the ratio data storage 319.

The CPU usage time collector 320 collects the data of the executed application and the CPU usage time from each node of the computing nodes 5, and stores the collected data into the CPU usage time storage 321. The CPU usage time totaling unit 322 carries out a totaling processing, reading out data from the CPU usage time storage 321, and stores the processing result into the total CPU usage time data storage 323. The used resource basic-value processor 324 carries out a processing, reading out data from the total CPU usage time data storage 323 and the resource capability table 325, and stores the processing result into the used resource basic-value data storage 326.

The used capability basic-value calculator 327 carries out a processing, reading out data from the used resource basic-value data storage 326 and the ratio data storage 319, and stores the processing result into the used capability basic-value storage 328. The used capability ratio calculator 329 carries out a processing, reading out data from the used resource basic-value data storage 326 and the used capability basic-value storage 328, and stores the processing result into the used capability ratio storage 330. The charging processor 332 carries out a processing, reading out data from the used capability ratio storage 330, the cost data storage 331, and the user organization data storage 333, and stores the processing result into the charging data storage 334.

These specific contents of the processings will be described in detail in the explanation for a processing flow.

Figure 3:
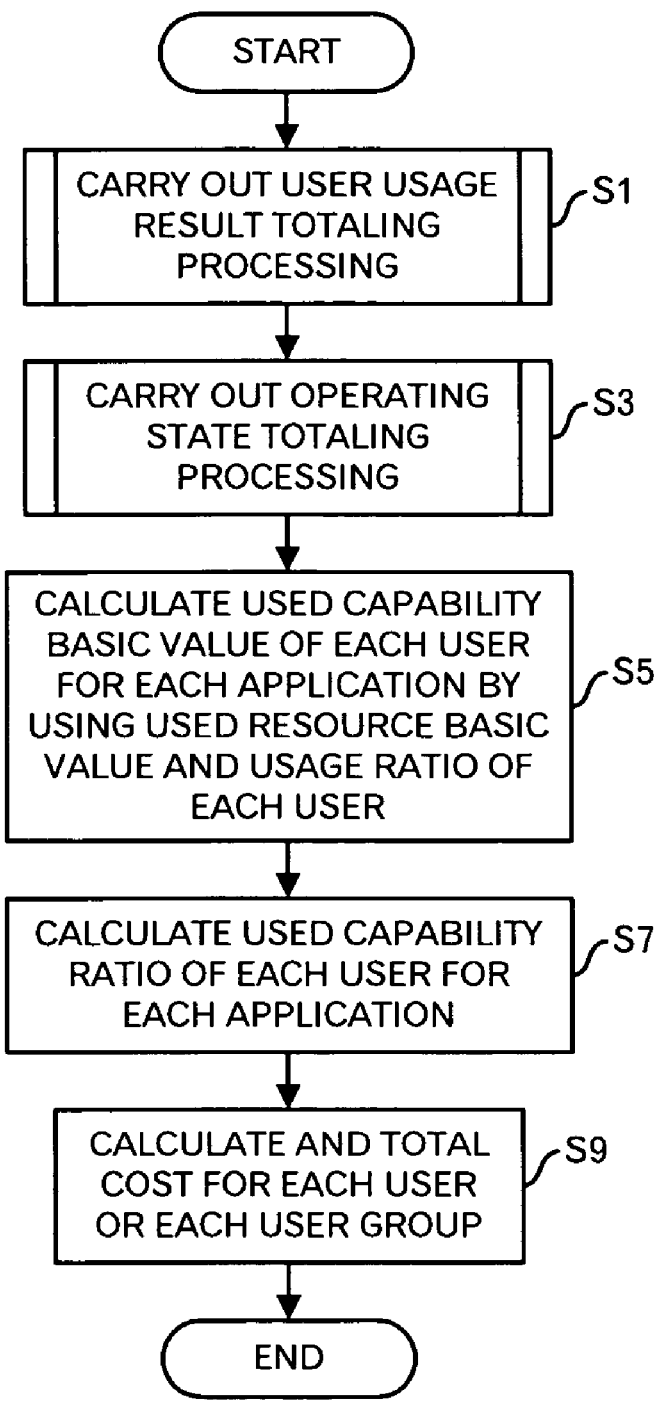
FIG. 3 is a diagram showing a main processing flow in the embodiment of this invention.
Figure 4:
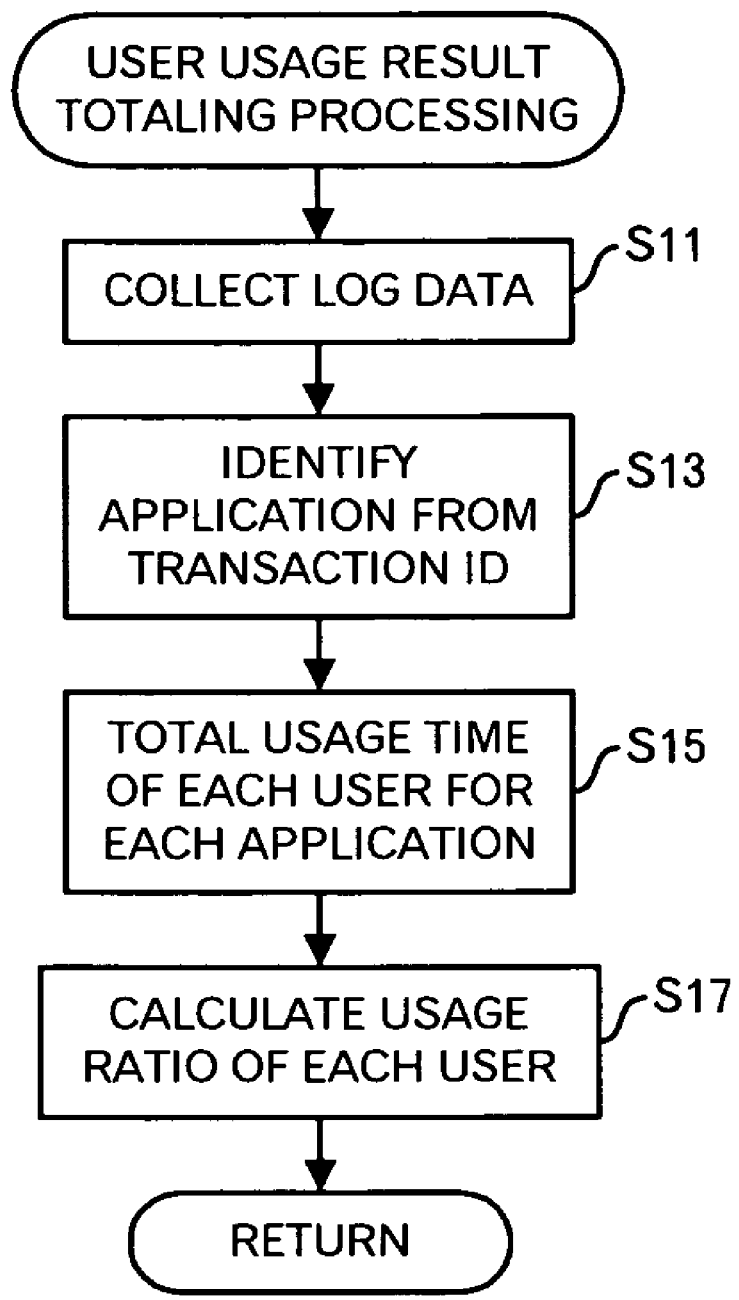
FIG. 4 is a diagram showing a processing flow of a user usage result totaling processing.

Next, the processing flow of the usage state analysis processor 31 in the computer system 1 will be explained by using FIGS. 3 to 17. First of all, a user usage result totaling processing is carried out (FIG. 3: step S1). These details are explained by using FIG. 4. First, the log data collector 311 collects the log data from each node of the computing nodes 5, and stores the collected log data into the log data storage 312 (step S11). Although it was also described above, the log data includes the client side IP address, the logon user ID, the server IP address of the access destination, the transaction ID that can identify the application, and the access time. The data stored in the log data storage 312 is shown in FIG. 5, for instance. An example of the data table shown in FIG. 5 has a column of the client side IP address, a column of the logon user ID, a column of the server IP address of the access destination, a column of the transaction ID that can identify the application, and a column of the access time (second). That is, the logon user ID, the server IP address of the access destination, and the access time are registered for each transaction (each transaction ID) with a client terminal.

Next, the application specifying unit 313 refers to the application specification table 314 to identify an application from a transaction ID of a record stored in the log data storage 312, and stores data of the identified application in the modified log data storage 315 (step S13). An example of data stored in the application specification table 314 is shown in FIG. 6. In the example of the data table shown in FIG. 6, a part of the transaction ID is associated with a code representing the application. Therefore, the code representing the application is identified from the transaction ID of the record stored in the log data storage 312. The data shown in FIG. 7 is stored in the modified log data storage 315. The example of the data table of FIG. 7 is a table in which a column of an application is added to the example of the data table shown in FIG. 5. That is, the application is associated with the user and the access time.

Figures 9, 10:
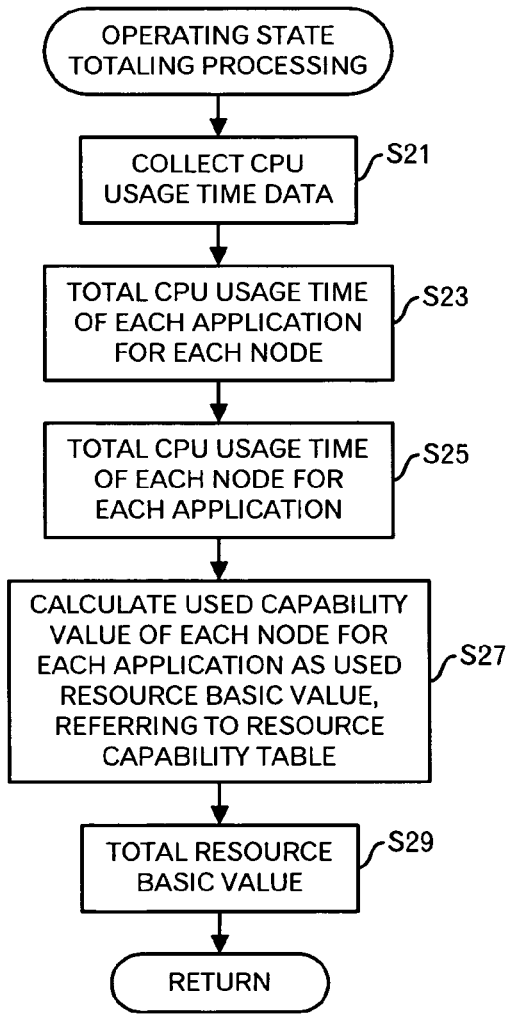
FIG. 9 is a diagram showing an example of data stored in a ratio data storage.
FIG. 10 is a diagram showing a processing flow of an operating state totaling processing.

Next, the user usage time totaling unit 316 reads out data from the modified log data storage 315 to total the usage time (access time) of each user for each application, and stores the totaling result into the total usage time data storage 317 (step S15). Because the log data stored in the modified log data storage 315 is generated for each transaction, it totals the usage time of each user for each application. FIG. 8 shows an example of the totaling result stored in the total usage time data storage 317. An example of the data table of FIG. 8 includes a column of an application name (service name), a column of a logon user ID, and a column of a usage time (access time) (second). The usage time represents a totaled value. Then, the user usage ratio calculator 318 reads out data from the total usage time data storage 317 to calculate a usage ratio of each user for each application, and stores the calculation result into the ratio data storage 319 (step S17). More specifically, it calculates the total usage time for each application, and calculates (the usage time)/(the total usage time) for each user. FIG. 9 shows an example of data stored in the ratio data storage 319. An example of the data table of FIG. 9 is a table in which a column of a ratio is added to the example of the data table shown in FIG. 8. However, a column of the usage time is unnecessary in the ratio data storage 319. Then, the control returns to the processing of FIG. 3.

Next, an operating state totaling processing is carried out (step S3). The details of this processing are explained using FIGS. 10 to 14. First, the CPU usage time collector 320 collects log data of the CPU usage time of each application from each node of the computing nodes 5, and stores the collected data into the CPU usage time storage 321 (step S21). For instance, because the application instructed by the control node 3 is executed serially or in parallel in each node of the computing nodes 5, the log data of the CPU usage time of the application is collected in each node, and transmitted to the control node 3.

Then, the CPU usage time totaling unit 322 reads out data from the CPU usage time storage 321 to total the CPU usage time of each application for each node, and stores the totaling result into the total CPU usage time data storage 323 (step S23). FIG. 11 shows an example of data stored in the total CPU usage time data storage 323. An example of the data table of FIG. 11 includes a column of the CPU usage time of the ERP that is an application, a column of the CPU usage time of DWH (Data Warehouse) that is an application, a column of the CPU usage time of CRM that is an application, a column of the CPU usage time of a credit and debt system that is an application, and a column of the total usage time, and the totaling result of the CPU usage time of each application and the total CPU usage time are associated with each node.

Moreover, the CPU usage time totaling unit 322 reads out data from the total CPU usage time data storage 323 to total the CPU usage time of each node for each application, and stores the totaling result into the total CPU usage time data storage 323 (step S25). This transforms data as shown in FIG. 11 into data as shown in FIG. 12. An example of the data table of FIG. 12 has a column of the application name, a column of the node, and a column of the CPU usage time. That is, for each application such as ERP, DWH, CRM, an accounting system, a credit and debt system, and a patent management system, the node that executes the application and the CPU usage time are registered.

Next, the used resource basic-value processor 324 reads out data from the total CPU usage time data storage 323 and the resource capability table 325 to calculate a used capability value of each node for each application as a used resource basic value, and stores the calculation result into the used resource basic-value data storage 326 (step S27). FIG. 13 shows an example of the resource capability table 325. In the example of FIG. 13, a relative capability value of each node is registered. Therefore, the capability value of node 1 is 30, for instance. Moreover, when referring to FIGS. 11 and 12, because the CPU usage time of the ERP for the node 1 is 530000, and the total CPU usage time is also 530000, the node 1 executed the ERP by 100%. Therefore, the used capability value of the ERP in the node 1 becomes 30 (=530000/530000×30). Moreover, the ERP is also executed on node 2, and the used capability value of the ERP for the node 2 is calculated as follows: the CPU usage time of the ERP for the node 2 (10000)/the total CPU usage time of the node 2 (210000)×the capability value of the node 2 (30)=the used capability value of the ERP for the node 2 (1.4). By carrying out such a processing, data as shown in FIG. 14 is stored into the used resource basic-value data storage 326. An example of the data table of FIG. 14 includes a column of the application name, a column of the node, a column of the CPU usage time, a column of the used resource basic value, and a column of the total used resource basic value. Thus, the used capability value of each node for each application, that is, the used resource basic value is calculated, and registered.

Then, the used resource basic-value processor 324 reads out data from the used resource basic-value data storage 326 to calculate the total of the used resource basic values (the used capability value) for each application, and the total of the used resource basic values (the used capability value) of all applications, and stores them into the used resource basic-value data storage 326 (step S29). In the example of FIG. 14, a value in the column of the total used resource basic value and a value in a line of the total in the final line are calculated, and registered. Then, the control returns to the processing of FIG. 3.

Then, the used capability basic-value calculator 327 reads out data from the used resource basic-value data storage 326 and the ratio data storage 319 to calculate the used capability basic value of each user from the used resource basic value and the usage ratio of each user, for each application, and stores the calculation result into the used capability basic-value storage 328 (step S5). For instance, because the used resource basic value of the ERP is 31.4, and the usage ratio of a user named A001 is 0.25, the used capability basic value of 7.85 (=31.4×0.25) is calculated. As described above, the used capability basic value of each user is similarly calculated for each application. FIG. 15 shows an example of data stored in the used capability basic-value storage 328. The example of FIG. 15 includes a column of the application name, a column of the logon user ID, a column of the access time (second), a column of the ratio, and a column of the used capability basic value.

Figures 16, 17, 18:
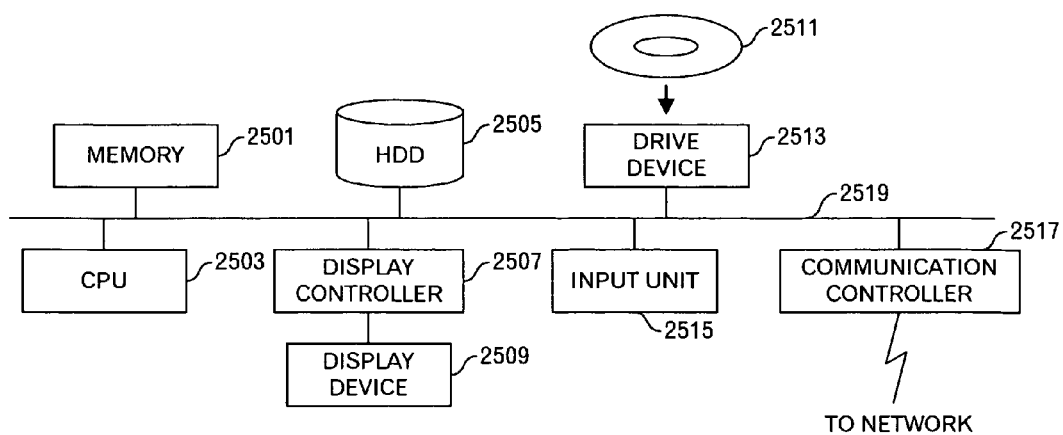
FIG. 16 is a diagram showing an example of data stored in a used capability ratio storage.
FIG. 17 is a diagram showing an example of data stored in a charging data storage.
FIG. 18 is a functional block diagram of a computer system.

Furthermore, the used capability ratio calculator 329 reads out data from the used capability basic-value storage 328 and the used resource basic-value data storage 326 to calculate a used capability ratio of each user for each application, and stores the calculation result into the used capability ratio storage 330 (step S7). Because the used capability basic value is calculated at the step S5, the used capability ratio can be calculated by dividing the used capability basic value by the total used capability value (130 in the example of FIG. 14). For instance, because the used capability basic value is 7.85 for the user named A001 as to the ERP, the used capability ratio is calculated as 7.85/130=0.06. FIG. 16 shows an example of data stored in the used capability ratio storage 330. In the example of the data table of FIG. 16, a column of the used capability ratio is added to the data table of FIG. 15.

By carrying out the aforementioned processing, it becomes possible to specify the user's system usage status that is represented by the used capability ratio of each user by taking into account the execution state of the applications in each node, even in a state in which plural applications are executed in the arbitrary nodes in the computer system having plural nodes. Incidentally, the processing may be terminated at this stage.

However, this used capability ratio can be used to charge for the system management cost for each user or each user group. When using it for the charging, the charging processor 332 refers to the used capability ratio storage 330, the cost data storage 331 storing data of all costs for one month, for example, and the user organization data storage 333 storing unit of charging to calculate and total the cost for each user or each user group, and stores the totaling result into the charging data storage 334 (step S9). For instance, when it is necessary to generate charging data for each user, the cost is calculated for each user by totaling the used capability ratios for each user in the data table as shown in FIG. 16 and multiplying the total cost by the totaling result. In addition, when the cost should be calculated for each user group, the cost for each user is totaled for each user group defined in the user organization data storage 333. The data as shown in FIG. 17 is stored into the charging data storage 334. The example of the data table of FIG. 17 has a column of a group, a column of the logon user ID, a column of the cost, and a column of a group cost. Here, in a case where group G1 is composed of logon users A001 and A002, and group G2 is composed of logon users A003, A004, and A005, the cost of each user is registered in the column of the cost, and the cost of each group is registered in the column of the group cost.

By carrying out such a processing, it becomes possible to allocate the cost which occurs in managing the computer system 1 to the users or the user groups accurately.

Although one embodiment of this invention has been explained above, this invention is not limited to the aforementioned embodiment. For instance, the functional block shown in FIG. 2 does not necessarily correspond to actual program modules. Moreover, it is also possible to replace the processing order of the steps S1 and S3, and to execute the steps S1 and S3 in parallel.

In addition, the computer including the control node 3 of the computer system 1 and the usage state analysis processor 31 made besides the control node 3 is the computer device shown in FIG. 18. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 22. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized. Incidentally, the NAS 7 may be used on behalf of the HDD 2505.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method, comprising:
   obtaining first data representing an execution state of an application program, among a plurality of application programs, used by users from nodes included in a computer system;
   first calculating second data representing a used capability value of said application program as a relative value by using said first data and third data representing capability values of said nodes, wherein said capability values of said nodes are relative values and the relative values relate the values of one node to another node;
   obtaining, from said nodes, fourth data representing an application program usage frequency that is data of an access time, for each of said users;
   second calculating fifth data representing application program usage ratios of said users by using said fourth data; and
   third calculating, for each of said users, sixth data representing a ratio of said used capability value for a total capability value of said computer system, for said application program, by using said second data and said fifth data,
   wherein said second calculating comprises:
   calculating a total access time of each of said users by using said fourth data; and
   calculating, as said fifth data, a ratio of said total access time of each of said users by dividing said total access time of each of said users by a sum of said total access times of all of said users who used said application program, and wherein said third calculating comprises: dividing a product of said second data and said fifth data of a specific user by a sum of said used capability values of all of said application programs.

2. The information processing method as set forth in claim 1, further comprising: totaling said ratios for each of said users or at least one user group, and generating charging data for each of said users or each of said at least one user group from the totaling result and a cost for said computer system.

3. The information processing method as set forth in claim 1, wherein said first data is a CPU usage time, and wherein said first calculating comprises:
   calculating a total CPU usage time in each said node by using said first data;
   totaling a CPU usage time of each said node for said application program;
   calculating a CPU usage ratio of each said node for said application program by using the totaled CPU usage time of each said node; and
   calculating a used capability value of said application program by calculating a used capability value of each said node for said application program from the calculated total CPU usage time, the totaled CPU usage ratio of each said node, the calculated CPU usage ratio of each said node, and said capability value of each said node, and totaling the calculated used capability values for said application program.

4. A computer-readable storage medium storing a program for causing a computer to execute a process, said process comprising:
   obtaining first data representing an execution state of an application program, among a plurality of application programs, used by users from nodes included in a computer system;
   first calculating second data representing a used capability value of said application program as a relative value, by using said first data and third data representing capability values of said nodes, wherein said capability values of said nodes are relative values and the relative values relate the values of one node to another node;
   obtaining, from said nodes, fourth data representing an application program usage frequency that is data of an access time, for each of said users;
   second calculating fifth data representing application program usage ratios of said users by using said fourth data; and
   third calculating, for each of said users, sixth data representing a ratio of said used capability value for a total capability value of said computer system, for said application program, by using said second data and said fifth data,
   wherein said second calculating comprises:
   calculating a total access time of each of said users by using said fourth data; and
   calculating, as said fifth data, a ratio of said total access time of each of said users by dividing said total access time of each of said users by a sum of said total access times of all of said users who used said application program, and
   wherein said third calculating comprises:
   dividing a product of said second data and said fifth data of a specific user by a sum of said used capability values of all of said application programs.

5. The computer-readable storage medium as set forth in claim 4, said process further comprising:
   totaling said ratios for each of said users or at least one user group, and generating charging data for each of said users or each said at least one user group from the totaling result and a cost for said computer system.

6. The computer-readable storage medium as set forth in claim 4, wherein said first data is a CPU usage time, and wherein said first calculating comprises:
   calculating a total CPU usage time in each said node by using said first data;
   totaling a CPU usage time of each said node for said application program;
   calculating a CPU usage ratio of each said node for said application program by using the totaled CPU usage time of each said node; and
   calculating a used capability value of said application program by calculating a used capability value of each said node for said application program from the calculated total CPU usage time, the totaled CPU usage ratio of each said node, the calculated CPU usage ratio of each said node, and said capability value of each said node, and totaling the calculated used capability values for said application program.

7. A computer comprising:
   a unit to obtain first data representing an execution state of an application program, among a plurality of application programs, used by users from nodes included in a computer system;
   a first calculating unit to calculate second data representing a used capability value of said application program as a relative value by using said first data and third data representing capability values of said nodes, wherein said capability values of said nodes are relative values and the relative values relate the values of one node to another node;
   a unit to obtain, from said nodes, fourth data representing an application program usage frequency that is data of an access time, for each of said users;
   a second calculating unit to calculate fifth data representing application program usage ratios of said users by using said fourth data; and
   a third calculating unit to calculate, for each of said users, sixth data representing a ratio of said used capability value for a total capability value of said computer system, for said application program, by using said second data and said fifth data,
   wherein said second calculating unit comprises:
   a unit to calculate a total access time of each of said users by using said fourth data; and
   a unit to calculate, as said fifth data, a ratio of said total access time of each of said users by dividing said total access time of each of said users who used said application program by a sum of said total access times of all of said users who used said application program, and
   wherein said third calculating unit comprises:
   a unit to divide a product of said second data and said fifth data of a specific user by a sum of said used capability values of all of said application programs.

8. The computer as set forth in claim 7, further comprising:
   a unit to total said ratios for each of said users or at least one user group, and to generate charging data for each of said users or each of said at least one user group from the totaling result and a cost for said computer system.

9. The computer as set forth in claim 7, wherein said first data is a CPU usage time, and wherein said first calculating unit comprises:
   a unit to calculate a total CPU usage time in each said node by using said first data;
   a unit to total a CPU usage time of each said node for said application program;

a unit to calculate a CPU usage ratio of each said node for said application program by using the totaled CPU usage time of each said node; and a unit to calculate a used capability value of said application program by calculating a used capability value of each said node for said application program from the calculated total CPU usage time, the totaled CPU usage ratio of each said node, the calculated CPU usage ratio of each said node, and said capability value of each said node, and totaling the calculated used capability values for said application program.

* * * * *